July 20, 1965   T. T. BROWN   3,196,296
ELECTRIC GENERATOR
Filed June 20, 1961
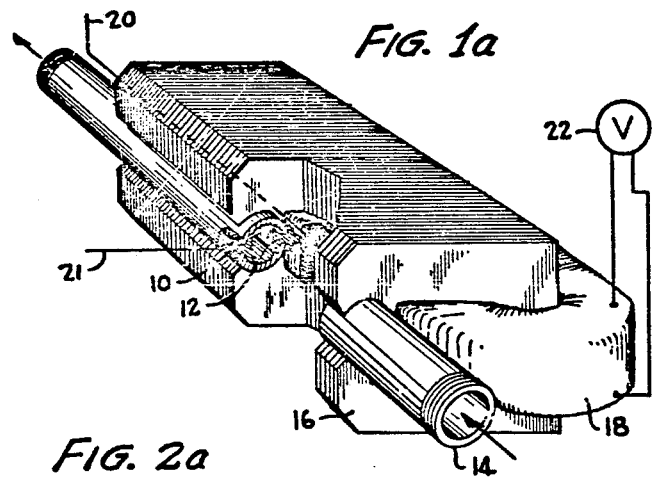
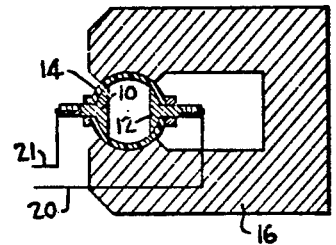
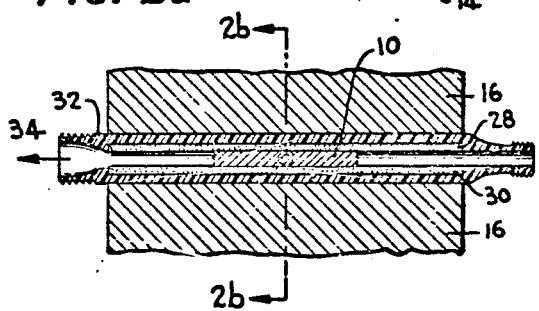
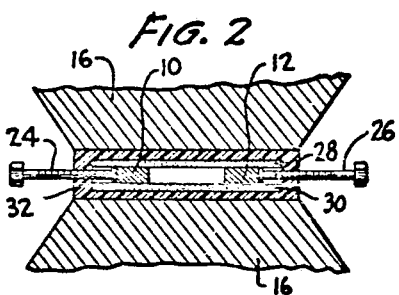
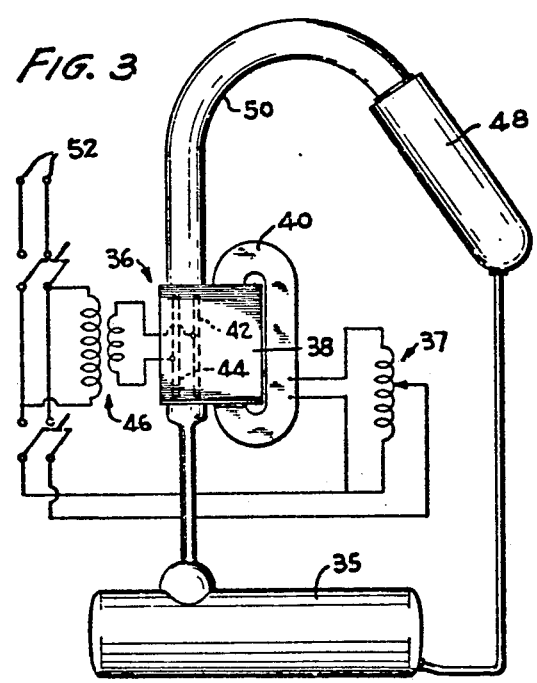
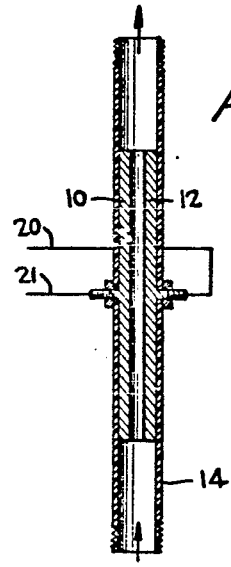
INVENTOR
T. TOWNSEND BROWN
BY Watson, Cole, Grindle & Watson
ATTORNEYS

United States Patent Office 3,196,296
Patented July 20, 1965

3,196,296
ELECTRIC GENERATOR
Thomas Townsend Brown, Bethesda, Md., assignor to Electrokinetics, Inc., a corporation of Pennsylvania
Filed June 20, 1961, Ser. No. 118,446
15 Claims. (Cl. 310—11)

This invention relates to generators of the electromagnetic type specifically adapted for the production of alternating current. Advantageously, the basic concept of the invention may be in two forms, i.e. those deriving power from (1) a moving electrically-conducting solid and (2) a moving conducting fluid.

It is an object of this invention to provide an improved electric generator.

It is another object of this invention to provide an improved generator for generating alternating currents.

It is a still further object of this invention to provide a device for converting the kinetic energy of moving fluent material to electrical energy.

It is another object of this invention to provide a device for generating electrical current in response to the movement of fluent material through a passage, which electrical current may be employed to indicate the rate of flow of the fluent material.

These and various other objects and features of the invention will be more clearly understood from a reading of the detailed description of the invention in conjunction with the drawing, in which:

FIGURE 1a is an illustration of the invention applied in a form deriving kinetic energy for the generation of electricity from a rapidly moving conducting material such as ionized vapor;

FIGURES 1b and 1c respectively show a longitudinal section of the fluid duct and a transverse section of the core and duct of the generator shown in FIGURE 1a.

FIGURES 2 and 2a show longitudinal and transverse views of an arc chamber with movable, replaceable electrodes such as might be employed in generators utilizing steam under pressure or other fluids of low electrical conductivity; and FIGURE 3 is a comprehensive illustration of a complete system employing this invention for the generation of alternating current from steam.

Referring more specifically to the attached drawings:

In FIGURE 1, two electrodes 10, 12 are arranged in an insulated tube 14. Magnetic core 16 of laminated iron is so arranged in relation to tube 14 that the magnetic circuit cuts through said tube at right angles. Coil 18, encircling core 16, is the output coil of the generator.

The exciter current (alternating current of commercial voltage and frequency) is supplied from an external source (not shown) and is conducted by the leads indicated 20, 21 to electrodes 10, 12. When fluid is forced with considerable velocity through tube 14 in one direction, and an alternating electrical current passes transversely through the stream between 10 and 12, an alternating magnetic flux is generated, the direction of which is at right angles both to the line of movement of the fluid and the direction of the current in said fluid. This alternating magnetic flux is concentrated by magnetic core 16 and induces current in output coil 18. The leads from the output coil conduct the generated current to an indicating (or recording) electrical measuring instrument 22 when the generator, in combination with 22, is to be used for the purpose of indicating flow, i.e. as a flowmeter. However, it will be obvious to those skilled in the art that the generator may be used in connection with many other devices consuming electrical energy.

FIGURES 2 and 2a are views in section of other arc chambers for use with the core 16 and coil 18 of FIGURE 1, adapting it for use with air, steam, mercury vapor, or those fluids less electrically conductive than water or the like. Gaseous fluids, like air, steam or mercury vapor, which are normally conductive only to a slight degree, are rendered more conductive by the intense ionization of the electric arc. In the form of this invention illustrated in FIGURE 2, the high voltage alternating current causing and maintaining the arc is likewise the excitation current of the generator. Flat electrodes 10, 12 are adjustable from feed screws 24, 26. The arc formed between these electrodes is initiated and maintained by a high voltage, making it unnecessary to move the electrodes except to offset their gradual burning away. The arc is formed in a space restricted by high-refractory plates 28, 30 which, in turn, are held in position by heavy insulated casing 32 and backe dfor mechanical strength by the laminated iron core 16, only a portion of which is shown.

Steam, or other fluent material, passes through the arc chamber in the direction of arrow 34, forcibly fanning the arc in the direction of arrow 34. The movement of the material, together with the transverse current of the A.C. arc, creates an alternating magnetic field within coil 18 of FIGURE 1.

FIGURE 3 is a combined diagrammatic and schematic illustration of a complete power unit showing a water or mercury boiler 35, the vapor-electric generator 36 which includes core 38, coil 40 and electrodes 42, 44, exciter transformer 46, vapor condenser 48, and electrical load 37, together with necessary steam lines and electrical wiring. The steam or other vapor generated in boiler 35 passes through the vapor-electric generator 36 and is reduced in velocity thereby. Thence, the low pressure steam flows in a larger pipe 50 and passes into condenser 48, is condensed and returned in liquid state to boiler 35, wherefrom the cycle is repeated.

It is obvious that in starting the generator, the exciter current must be present before actual generation begins. For this reason, the exciter 46 must have an independent source of energy supply 52. However, after the process is started, the power output may be tapped, as at transformer 37, for that fraction of the current required to excite the generator, but certain control devices attached to and comprising exciter 46 must be employed to maintain proper frequency and phase relation.

While in the foregoing specification I have outlined, in connection with the broader aspects of this invention, certain structures and details, I desire it understood that specific details have been referred to for the purpose of imparting a clear and concise description of the invention and not for the purpose of limitation. It will be apparent to one skilled in the art that many changes in design are possible and many forms and applications, other than those illustrated, may be resorted to without departing from the spirit and scope of this invention.

What is claimed is:

1. Method of generating alternating electric current comprising creating an alternating magnetic flux by the combination and relation of a flowing conducting medium and an applied transverse alternating current through said medium, arranging a stationary coil in the field of said alternating flux, and utilizing said flux to induce alternating current in said coil.

2. Method of generating alternating electric current comprising subjecting a moving fluent material to an alternating current at right angles to the line of motion, supplying a magnetic circuit and a coil under the inductive influence of said circuit, forcibly maintaining said fluid conductor in motion, and utilizing the created alternating magnetic flux to induce usable alternating current in said coil.

3. Method of creating a directed magnetic field comprising applying a difference of electrical potential across a movable substance, mechanically moving the substance, relative to the proposed magnetic field, in a direction normal to the line of maximum potential gradient in said substance and maintaining both the difference of potential and the movement of the substance normal to each other to create a directed magnetic flux the direction of which is normal to both the electrical gradient and the line of motion of said substance.

4. An electrical generator comprising a fluid conduit, a pair of opposed electrodes in said conduit, means for moving a fluent conducting medium between said electrodes, means for applying an alternating current to said electrodes to initiate and maintain a discharge through said fluent material between said electrodes and electromagnetic means coupled to said discharge to derive electrical energy therefrom.

5. A generator according to claim 4 wherein said fluent conducting material is a liquid.

6. A generator according to claim 4 wherein said fluent material is a gas.

7. A generator according to claim 4 wherein said fluent material is particulate.

8. A generator according to claim 4 further comprising means for adjusting the spacing between said electrodes.

9. A generator according to claim 4 wherein said electrical means includes a magnetic core positioned with its poles aligned substantially normal to the line between said electrodes and an inductance encircling at least a part of said core.

10. A generator according to claim 9 wherein said fluent conducting material is a liquid.

11. A generator according to claim 9 wherein said fluent material is a gas.

12. A generator according to claim 9 further comprising means for adjusting the spacing between said electrodes.

13. A generator according to claim 9 further comprising output means connected to said coil.

14. A generator according to claim 13 wherein said output means includes a meter.

References Cited by the Examiner

UNITED STATES PATENTS

| | | |
|---|---|---|
| 957,242 | 5/10 | Nofggerath. |
| 1,916,076 | 6/33 | Rupp. |
| 2,722,122 | 11/55 | Soffel. |
| 2,733,604 | 2/56 | Coulter. |

FOREIGN PATENTS

| | | |
|---|---|---|
| 841,613 | 6/52 | Germany. |
| 1,161,079 | 5/58 | France. |

MILTON O. HIRSHFIELD, *Primary Examiner.*